US006473399B1

United States Patent
Johansson et al.

(10) Patent No.: US 6,473,399 B1
(45) Date of Patent: Oct. 29, 2002

(54) METHOD AND APPARATUS FOR DETERMINING AN OPTIMUM TIMEOUT UNDER VARYING DATA RATES IN AN RLC WIRELESS SYSTEM WHICH USES A PDU COUNTER

(75) Inventors: Mathias Johansson, Sollentuna; Christian Roobol, Hässelby; Johan Larsson, Stockholm, all of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/201,389

(22) Filed: Nov. 30, 1998

(51) Int. Cl.[7] .............................. G01R 31/08; H04J 3/16
(52) U.S. Cl. ...................... 370/229; 370/329; 370/468
(58) Field of Search ................................ 370/229, 235, 370/242, 248, 252, 469–473, 310, 328, 329; 714/748–751; 455/466

(56) References Cited

U.S. PATENT DOCUMENTS

| 5,425,025 | A |   | 6/1995 | Tahara |         |
|-----------|---|---|--------|--------|---------|
| 5,896,402 | A | * | 4/1999 | Kurobe et al. | 370/216 |
| 5,930,233 | A | * | 7/1999 | Kanerva et al. | 370/231 |
| 5,940,380 | A | * | 8/1999 | Poon et al. | 370/330 |
| 5,958,080 | A | * | 9/1999 | Kang | 714/807 |
| 6,052,385 | A | * | 4/2000 | Kanerva et al. | 370/468 |
| 6,088,342 | A | * | 7/2000 | Cheng et al. | 370/320 |
| 6,212,176 | B1 | * | 4/2001 | Andersson et al. | 370/347 |

FOREIGN PATENT DOCUMENTS

| JP | 8-8995   | 1/1996 |
| WO | 96/30841 A | 10/1996 |

OTHER PUBLICATIONS

Stevens, TCP/IP Illustrated vol. 1, 1994, PP:275–283.*

* cited by examiner

Primary Examiner—David Vincent
(74) Attorney, Agent, or Firm—Nixon & Vanderhye, PC (57) ABSTRACT

A data communications unit determines both efficiently and accurately when one or more data units should be received under a variety of conditions. In particular, the present invention compensates for transmission delays and for varying transmission rates over the communications channel. During a communication between first and second communications nodes, the first node receives a sequence of data units transmitted from the second node. The first communications node determines that one or more of the transmitted data units was either not received at all or was erroneously received (i.e., corrupted). The first node then sends a request to the second node to retransmit the one or more data units not received or erroneously received. A retransmit timer is started when the retransmission request is sent. The retransmit timer accounts for the delay time period required for the retransmit request to reach the second node, for the second node to retransmit the requested data units, and for the retransmitted data units to reach the first node. When the timer indicates that the delay time period has occurred/ expired, a counter is started. Based on the counter's value, a determination is made whether all of the data units requested to be retransmitted have been properly received. If the determination indicates that the requested one or more data units has been retransmitted and properly received, no further action is taken. On the other hand, if the requested one or more data units to be retransmitted is not received or is erroneously received, the above-described procedure is repeated.

39 Claims, 7 Drawing Sheets

METHOD AND APPARATUS FOR DETERMINING AN OPTIMUM TIMEOUT UNDER VARYING DATA RATES IN AN RLC WIRELESS SYSTEM WHICH USES A PDU COUNTER

FIELD OF THE INVENTION

The present invention relates to reliable data communications. In one particular example, the invention relates automatic repeat request (ARQ) type mechanisms used to increase the reliability of communications. In this example context the invention may be used to improve the efficiency of such ARQ-based communications.

BACKGROUND AND SUMMARY OF THE INVENTION

Data packet communications are typically "best effort" packet delivery systems. Best effort delivery makes an earnest attempt to deliver the packets, i.e., it does not discard them capriciously. Indeed, data packet services are typically called unreliable because the delivery is not guaranteed, i.e., packets may be lost, duplicated, delayed, or delivered out of order.

Nevertheless, many data communications applications require or at least benefit from a greater degree of reliability. One way of increasing the reliability of transmission is for two communication units to exchange of an acknowledgment message so they know if and when a particular message has been transferred successfully. The use of positive and/or negative acknowledgments with retransmission to increase reliability is typically referred to as automatic repeat request (ARQ). More specifically, a transmitter sends data units to a receiver. The receiver replies by sending back to the transmitter a positive acknowledgment if a data unit is properly received. A negative acknowledgment is sent if a data unit is not properly received, i.e., a data unit received with errors (or at least too many errors to correct efficiently) and a data unit simply not received. In the negative acknowledgment situation, the receiver then sends a request to the transmitter to retransmit the data units that were not properly received.

The concern then is when should a decision be made to retransmit a data unit. One approach is to use an ARQ timer to determine when to retransmit a data unit, (e.g., a protocol data unit). In particular, the timer may be started when the data unit is transmitted. If the timer expires before receiving a positive acknowledgment, the data unit is automatically retransmitted.

The drawback with such an ARQ timer is that it is quite difficult to set the ARQ timer to the best time-out value. If the time-out value is set too small, the ARQ timer will likely time out too early, i.e., before an acknowledgment could reasonably be expected to be received. In other words, if some additional time had been waited, the acknowledgment would have been received, thereby avoiding an unnecessary retransmission request and the retransmission of the data unit. Thus, a time-out value that is too small leads to undesired retransmit requests and retransmissions. Both waste communications resources which can be a particular problem in communications systems such as radio communications systems where bandwidth is quite limited. On the other hand, if the time-out value is set to too large, large and unnecessary delays in retransmission requests are generated. Such delays ultimately slow down the effective throughput of the communications system.

The problem of selecting the right time-out value is further complicated in systems where the data rate of the physical communications channel can vary. In some systems like the third generation cellular telephone systems that offer a wide variety of services, the data rate may change very rapidly, e.g., every radio frame—which may be on the order of ten milliseconds. An optimal time-out value for one data rate may well be too long or too short for other data rates. Consequently, it is quite difficult to assign the correct value to achieve an optimum time out under varying circumstances.

It is an object of the present invention to provide reliable as well as efficient data communications.

It is an object of the present invention to provide reliable as well as efficient data communications under a variety of conditions.

It is another object of the present invention to provide a mechanism to efficiently determine when one or more data units should have been received.

It is yet another object to provide an automatic retransmit request (ARQ) procedure that optimally adapts to different communication conditions, and in particular, different channel transmission rates.

The present invention avoids the drawbacks with a simple timer approach and meets the objectives described above by permitting a communication unit to determine both efficiently and accurately when one or more data units should be received under a variety of conditions. In particular, the present invention compensates for transmission delays and for varying transmission rates. While examples of the invention are disclosed below generally in an ARQ-type environment, the invention has broader application to any communications situation where a receiver requests transmission of and awaits reception of one or more data units.

During a communication between first and second communications nodes, the first node receives a sequence of data units transmitted from the second node. The first communications node determines that one or more of the transmitted data units was either not received at all or was erroneously received (i.e., corrupted). The first node then sends a request to the second node to retransmit the one or more data units not received or erroneously received. A retransmit timer is started when the retransmission request is sent. The retransmit timer accounts for the delay time period required for the retransmit request to reach the second node, for the second node to process the request and start transmitting the requested data units, and for the first retransmitted data unit to reach the first node.

When the timer indicates that the delay time period is over, a counter is started. Based on the counter's value, a determination is made whether all of the data units requested to be retransmitted has been properly received. If the determination indicates that the requested one or more data units has been retransmitted and properly received, no further action is taken. On the other hand, if the requested one or more data units to be retransmitted is not received or is erroneously received, the above-described procedure is repeated.

Preferably, this timer is started simultaneously with the sending of the request for retransmission from the first node to the second node. The counter is also preferably initialized at or before the starting of the timer. The count value is changed after each time interval during which a number of data units is transmitted between the first and second nodes. One example of such a time interval is a communications frame. In an example embodiment, the counter is incremented after each time interval with the number of data units that should have been received during that time interval. For example, if two data units are currently transmitted per time interval, the counter is incremented by two. When the count value reaches the number of data units requested to be retransmitted, this is a good time for the first communications node to decide whether the data units requested to be retransmitted have been properly received. At that point in time, those requested data units should have been retransmitted by the second communications node and received by the first communications node.

As explained above, the present invention may be advantageously employed in any request for transmission of data units. By accounting for the round trip delay of request to transmit certain data units, the counter then starts counting expected data units at a point in time from which it is reasonable to expect that the requested units will have been transmitted and possibly received. The counter adjusts to changes in transmission rate on the communications channel by changing its count value only by the number of data units that should be received per each time interval. Thus, more time is effectively provided when the transmission rate is lower and less time is allowed at higher transmission rates. The end result is an efficient and optimum balance between delay (waiting too long to request a retransmission when the requested data units are not properly received) and unnecessary retransmit requests and retransmission (before the data units have had a reasonable chance to be received).

A preferred example embodiment of the present invention is disclosed in the context of a wideband code division multiple access (WCDMA) radio communications system. In this example context, the invention is carried out as an automatic repeat request technique implemented at a radio link control (RLC) communications protocol layer. This ARQ technique is implemented at the RLC layer both in a mobile station and in a radio access network entity using a counter and a timer. The counter stores a count value indicating the number of data units to be retransmitted. The timer causes the counter to start counting after a time interval associated with the retransmit request. The invention is particularly advantageous in this environment because the data transmission rate over a radio channel may rapidly change on a frame-by-frame basis.

BRIEF DESCRIPTION OF THE DRAWINGS

The foregoing and other objects, features, and advantages of the invention will be apparent from the following description of preferred example embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, data flows, signaling implementations, protocols, techniques, etc., in order to provide an understanding of the present invention. However, it will be apparent to one skilled in the art that the present invention may be practiced in other embodiments that depart from these specific details. For example, while an example embodiment of the present invention is disclosed in the context of a particular protocol layer, i.e., the link layer, those skilled in the art will appreciate that the present invention can be implemented in any appropriate communications protocol or protocol layer. In other instances, detailed descriptions of well-known methods, interfaces, devices, and signaling techniques are omitted so as not to obscure the description of the present invention with unnecessary detail.

Figure 1:
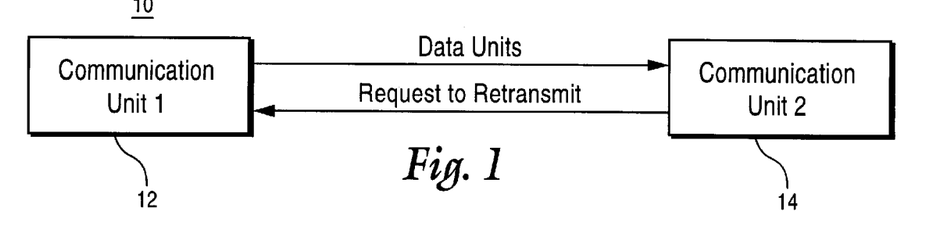
FIG. 1 is a diagram of a communications system in which the present invention may be employed.

FIG. 1 illustrates a communications system 10 including a first communications unit 12 and a second communications unit 14. Units of data (which may include substantive message information, control information, or both) are communicated from the first communications unit 12 to the second communications unit 14 over an appropriate communications medium. A non-limiting example of a data unit is a protocol data unit (PDU); however, larger, smaller, or differently formatted data units are also applicable. When the second communications unit 14 detects that one or more of the data units has either not been received or has been received erroneously, it transmits to the first communications unit 12 a request to retransmit those detected data units.

Thereafter, if the second communications unit 14 does not receive the requested data units by a certain point in time, it sends another request to retransmit those same data units. That certain point in time is determined using a two-stage process. First, when the retransmit request is transmitted, the second communications unit 14 waits a predetermined time period corresponding to an expected round trip delay for the first communications unit 12 to receive and process the retransmit request and for the second communications unit 14 to receive the first retransmitted data unit. Second, after that predetermined time period, the second communications unit 14 counts up to (or down from) the number of PDUs which should thereafter be received. If the requested data units are not all received when the counter reaches that number, another request to retransmit those data units is sent.

Figure 2:
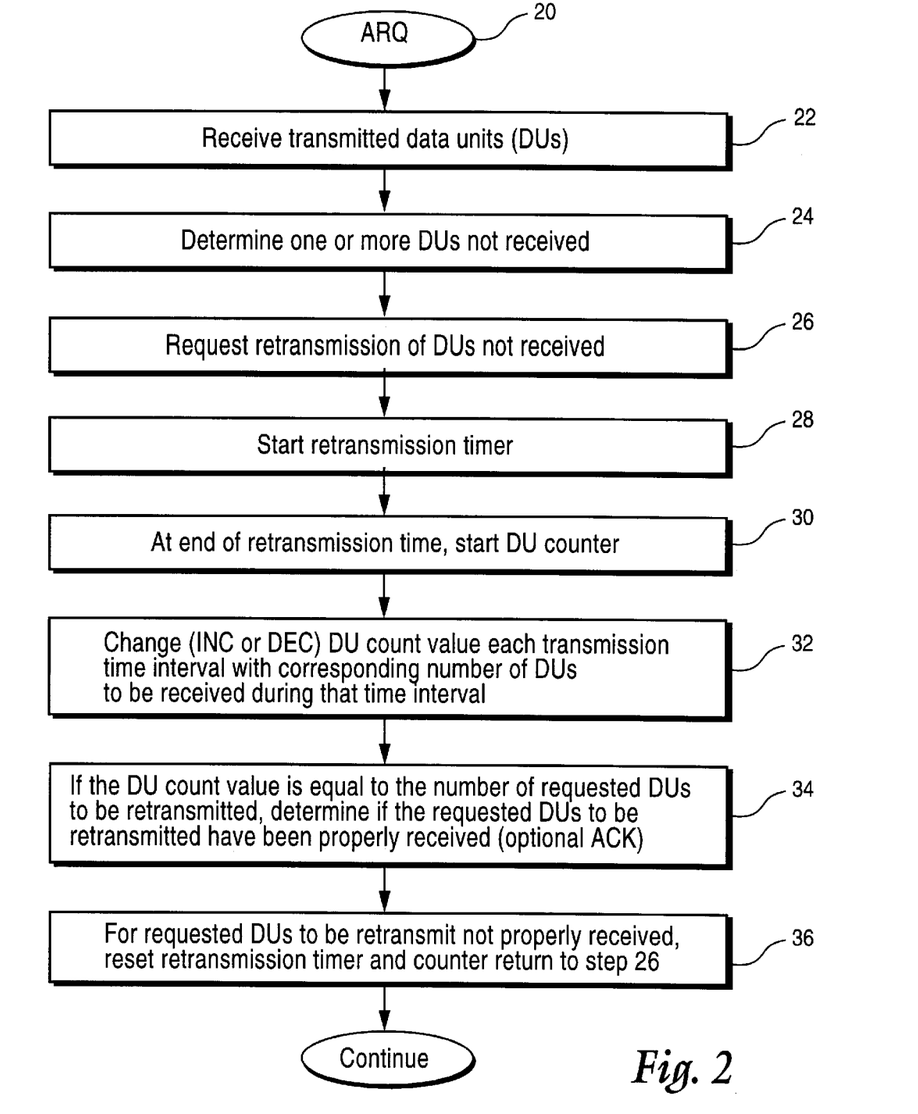
FIG. 2 is a flowchart illustrating procedures for implementing the present invention in one example embodiment.

FIG. 2 illustrates an automatic repeat request (ARQ) routine (block 20) that incorporates an example, non-limiting implementation of the present invention. A receiving communications unit, such as unit 14 from FIG. 1, receives data units transmitted by a transmitting communications unit such as unit 12 from FIG. 1 (block 22). The communications unit 14 determines that one or more data units were either not received or were received erroneously (block 24). Communications unit 14 then requests retransmission of those one or more data units (block 26). At or about the same time as the request for retransmission is sent, the second communications unit also starts a retransmission timer (block 28). The retransmission timer generates an output after a predetermined, retransmit time period that accounts for the propagation delay of sending the request to transmit and the actual retransmission. It also accounts for processing time in both communications units and for other conditions/parameters.

The end of the retransmit time period corresponds to when the first requested data unit to be retransmitted should be received. At that time, the communications unit 14 starts a data unit counter (block 30). Thereafter, the data unit count value in the counter is changed by incrementing up to a count value that corresponds to the number of data units which should be received (or alternatively by decrementing from that number to zero). The count value is changed each transmission time interval, e.g., at the end of a transmission frame, by an amount that corresponds to the number of PDUs to be received for that transmission time interval based on the current transmission rate (block 32).

When the data unit count value reaches the number of data units that were requested to be retransmitted, the communications unit 14 determines if the requested data units to be transmit have been properly received (block 34). If so, the communications unit 14 continues to receive new data units from communications unit 12. Optionally, communications unit 14 may send a positive acknowledgment to communications unit 12 that the requested data units have been properly received. On the other hand, if any one of the requested data units to be transmit is not properly received by the time the data unit counter reaches the appropriate count value, the retransmission timer and the counter are reset (block 36), and the procedures beginning at block 26 are repeated.

Figure 3:
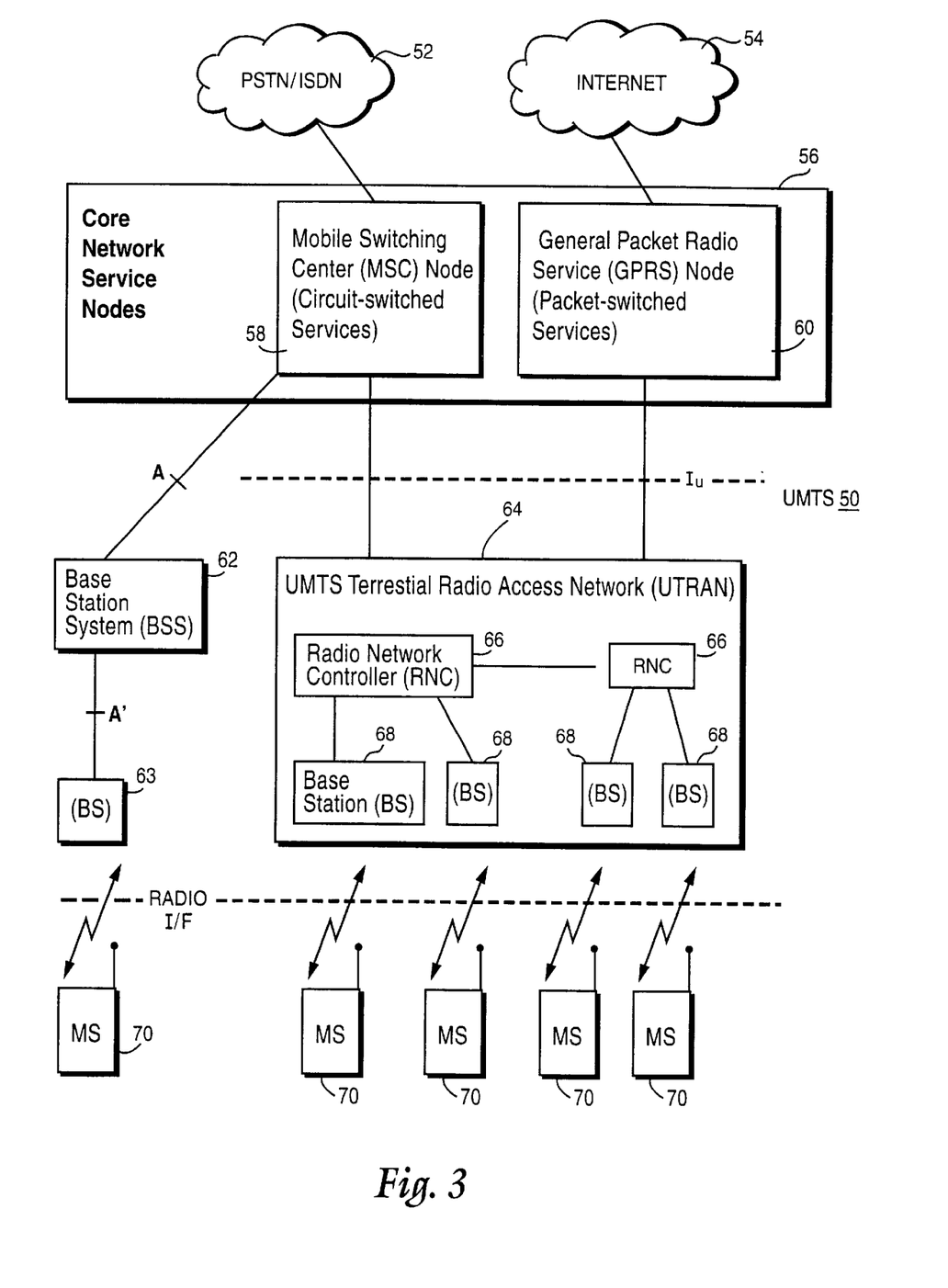
FIG. 3 is a function block diagram illustrating an example wideband code division multiple access (WCDMA) radio communications system where the present invention may be advantageously employed.

One example application of the present invention is now described in the context of the universal mobile telecommunications system (UMTS) 50 shown in FIG. 3. A representative, connection-oriented, external core network, shown as a cloud 52, may be for example the Public Switched Telephone Network (PSTN) and/or the Integrated Services Digital Network (ISDN). A representative, connectionless-oriented, external core network, shown as a cloud 54, may be for example the Internet. Both core networks are coupled to corresponding service nodes 56. The PSTN/ISDN connection-oriented network 52 is connected to a connection-oriented service node shown as a mobile switching center (MSC) node 58, that provides circuit-switched services. In the existing GSM model, the mobile switching center 58 is connected over an interface A to a base station system (BSS) 62 which in turn is connected to a radio base station 63 over interface A'. The Internet connectionless-oriented network 54 is connected to a General Packet Radio Service (GPRS) node 60 tailored to provide packet-switched type services.

Each of the core network service nodes 58 and 60 connects to a UMTS Terrestrial Radio Access Network (UTRAN) 64 over a UTRAN interface ($I_U$). The UTRAN 64 includes one or more radio network controllers 26. Each RNC 66 is connected to a plurality of base stations (BS) 68 and to any other RNCs in the UTRAN 64. Radio communications between the base stations 68 and mobile radio stations (MS) 70 are by way of a radio interface. Radio access is based on wideband-CDMA (WCDMA) with individual radio channels allocated using WCDMA spreading codes. WCDMA provides the wide bandwidth for multimedia services and other high rate demands as well as robust features like diversity handoff and RAKE receivers to ensure high quality.

Figure 4:
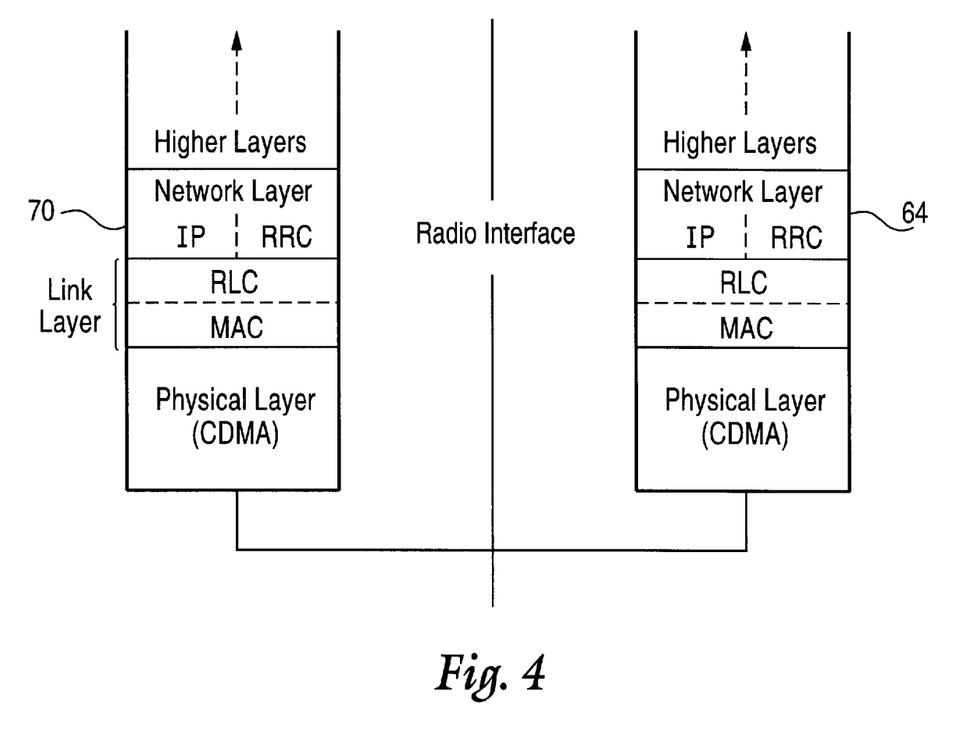
FIG. 4 is a diagram illustrating several lower level communication protocol layers that may be employed in the system shown in FIG. 3.

The radio interface shown in FIG. 3 is divided into several protocol layers, with several lower level layers illustrated in FIG. 4. In particular, a mobile station 70 uses these protocol layers to orchestrate communication with similar protocol layers in the UTRAN 64. Both protocol stacks include: a physical layer, a data link layer, and a network layer. The data link layer is split into two sublayers: a radio link control (RLC) layer and a medium access control (MAC) layer. The network layer is divided in this example into a control plane protocol (RRC) and a user plane protocol (IP).

The physical layer provides information transfer services over the air interface using wideband CDMA performs the following functions: forward error correction encoding and decoding, macrodiversity distribution/combining, soft handover execution, error detection, multiplexing and demultiplexing of transport channels, mapping of transport channels onto physical channels, modulation and spreading/demodulation and despreading of physical channels, frequency and time synchronization, power control, RF processing, and other functions.

The medium access control (MAC) layer provides unacknowledged transfer of service data units (SDUs) between peer MAC entities. The MAC functions include selecting an appropriate transport format for each transport channel depending on data rate, priority handling between data flows of one user and between data flows different users, scheduling of control messages, multiplexing and demultiplexing of higher layer PDUs, and other functions. The RLC performs various functions including the establishment, release, and maintenance of an RLC connection, segmentation and reassembly of variable length, higher layer PDUs into/from smaller RLC PDUs, concatenation, error correction by retransmission (ARQ), in sequence delivery of higher layer PDUs, duplicate detection, flow control, and other functions.

The control plane part of the network layer in the UTRAN consists of a radio resource control protocol (RRC). The RRC protocol handles the control signaling over the radio interface, e.g., radio access bearer control signaling, measurement reporting and handover signaling. The user plane part of the network layer includes the traditional functions performed by layer 3 protocols such as the well known Internet Protocol (IP).

Figure 5:
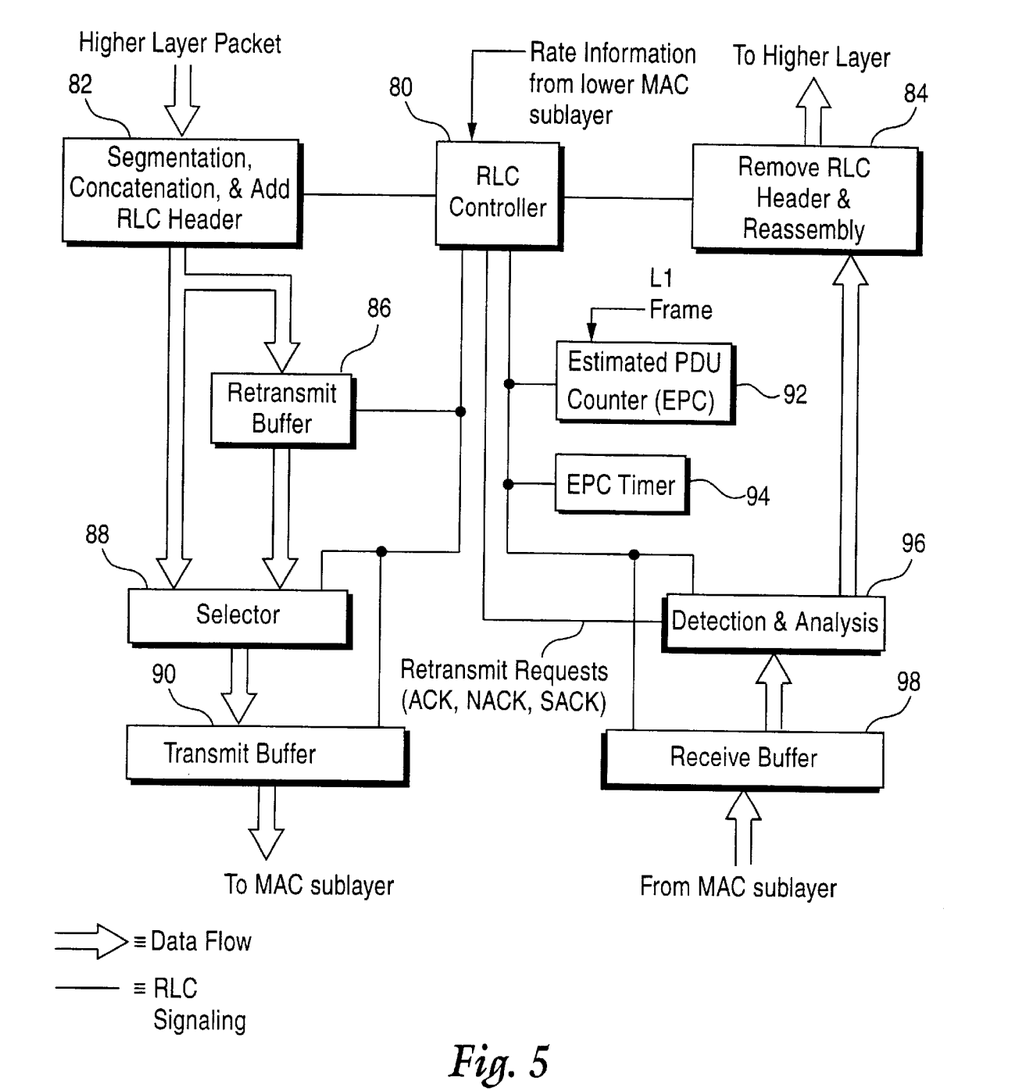
FIG. 5 is a function block diagram illustrating another example implementation of the present invention in the context of the system shown in FIG. 3.

FIG. 5 shows a function block diagram of an example implementation of the present invention in the RLC layer of a UMTS entity such as the mobile 70 or the RLC layer of an RNC 66 shown in FIG. 3. In this RLC layer implementation, the overall RLC layer operation and various specific RLC layer functions may be supervised and generally controlled by the RLC controller 80. Although specific function blocks are shown in FIG. 5, those functions may be performed using any suitable hardware and/or software. For example, a counter or a timer may be implemented in hardware or in software.

On the transmit side of the communication entity at the RLC layer, higher layer packets are received in a segmentation, concatenation, and add RLC header block 82. The higher layer packets are segmented and/or concatenated to PDUs of fixed length. The PDU length is decided when a particular radio access network service is established for communication involving a particular mobile station. Once the RLC header is added to each PDU, they are stored both in a retransmit buffer 86 and in a transmit buffer 90 via selector 88. The PDUs stored in the transmit buffer 90 are then transmitted in accordance with flow control signals from the RLC controller 80 to the lower MAC layer for transmission via the physical layer to the receiver over the radio interface. When a request to retransmit one or more PDUs is received, (e.g., ACK, NACK, or SACK), the RLC controller 80 controls selector 88 to select PDUs stored in the retransmit buffer 86 for transmission via the transmission buffer 90.

On the receive side of the communication entity at the RLC layer, PDUs are received from a logical channel from the MAC sublayer. The received PDUs are placed in a receive buffer 98 and then processed by a detection and analysis block 96. Block 96 forwards properly received PDUs to block 84 where the RLC headers are removed from the PDUs, and the PDUs are reassembled into higher layer packets which then delivered to higher protocol layers.

When the detection and analysis block 96 detects that a PDU is either missing or erroneously received, a retransmit request signal is generated, e.g., in the form of a negative acknowledgment (NACK) or a selective acknowledgment (SACK). That retransmit request is forwarded to the RLC controller 80 . Retransmit requests receive priority in the transmit buffer 90 over other PDUs waiting to be transmit using appropriate control signals from the RLC controller 80 to the retransmit buffer 86, the selector 88, and the transmit buffer 90.

At or about the same time that the retransmit request is generated, the detection and analysis block 96 also starts an estimated PDU counter (EPC) timer 94. The EPC timer 94 is set with a retransmit time corresponding to a time that compensates for the round trip propagation delay of a retransmission request and an initial response, the processing time in the transmitter and receiver, and the frame structure. When the EPC timer 94 indicates that the retransmit time is over, an estimated PDU counter (EPC) 92 is enabled or started. The EPC timer 94 could also be implemented as a counter which counts the number of radio frames expected to elapse before the first requested PDU to be retransmitted would likely be actually received.

The EPC 92 may be set to increment up to the number of PDUs which were requested to be transmitted, or alternatively, to decrement down to the number of PDUs requested to be transmitted. In this example, the EPC 92 is incremented every physical layer (L1) time period which is typically one radio frame; however, the L1 period may be more than one radio frame. Within an L1 time period, an integer number of PDUs is transmitted. The integer number depends on the size of the PDU and the rate at which the PDUs are transmitted.

In the UMTS 50, it is possible that after every L1 time period, the transmission rate may change. Consequently, the number of PDUs may change as well. Transmission rate information bits may be transmitted in parallel with the data PDUs from the MAC layer and are used by the RLC controller 80 to determine the transmission rate for the current L1 time period. The RLC controller then estimates how many PDUs should have been sent during the current L1 time period. The EPC 92 is incremented (or decremented) every L1 time period with the estimated number of PDUs, (provided by the RLC controller 80 based on the most recently received rate information received from the MAC layer), that should have been transmitted during the current L1 time period.

When the EPC 92 reaches the number of outstanding PDUs requested to be retransmitted, the detection and analysis block 96 detects whether those requested PDUs have in fact been properly received upon retransmission. If so, reception and processing of new PDUs continues. However, if one or more of the PDUs requested to be retransmitted have not been received correctly as determined by the detection and analysis block 96, the EPC 92 and the EPC timer 94 are reset. In addition, a new retransmission request is sent requesting that these outstanding PDUs be retransmitted (again). The EPC timer 94 is again started, and the process described above is repeated.

Figure 6:
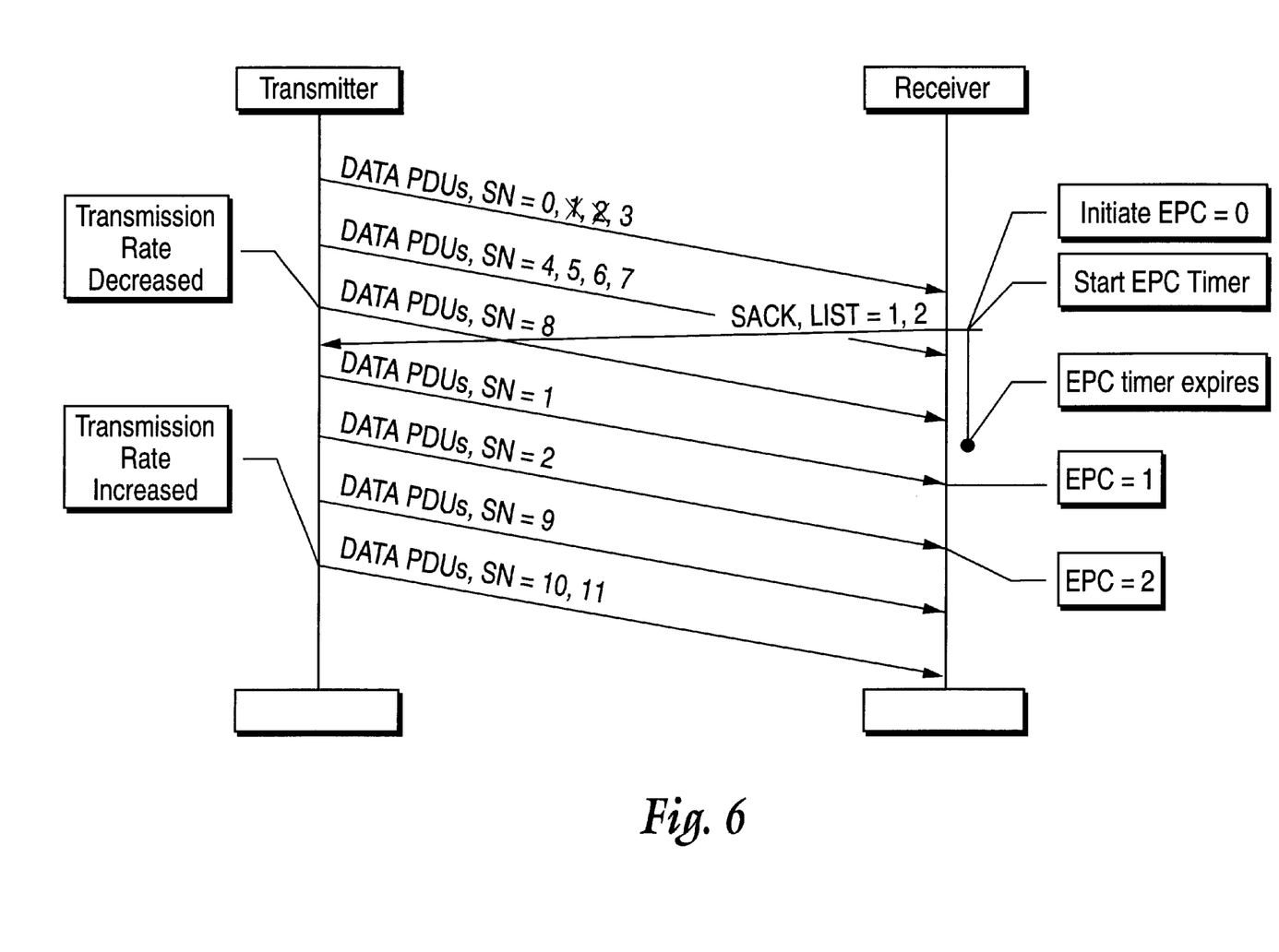
FIG. 6 is a diagram illustrating a specific example of the present invention.

Reference is made now to FIG. 6 showing a specific example. The transmitter sends four PDUs having sequence numbers 0, 1, 2, and 3 at a higher transmission rate (i.e., four PDUs per L1 frame). PDUs 1 and 2 are either lost or erroneously received. The receiver therefore sends a selective acknowledgment (SACK) back to the transmitter requesting that PDUs 1 and 2 be retransmitted. At the same time, the EPC is set to zero, and the EPC timer is started. Note that each arrow from the transmitter to the receiver represents an L1 time period. In the next L1 time period, the transmitter sends four more data PDUs corresponding to sequence numbers 4, 5, 6, and 7. Thereafter, the transmission rate is decreased from four PDUs per L1 time period to one PDU per L1 time period.

The transmitter then receives the SACK message from the receiver requesting retransmission of PDUs 1 and 2. Requests for retransmissions receive higher priority, and therefore, the transmitter retransmits PDU 1 during the next L1 time period. Since only one PDU is now transmitted at the lower transmission rate during one L1 time period, the transmitter sends only one PDU 8 during the next L1 time period. After receiving PDU 8, the EPC timer expires which enables the EPC counter. When the next L1 time period occurs corresponding to the retransmission of PDU 1, the EPC is incremented by one.

Recall that rate information is provided in parallel with data, and in one implementation, may be included in transport format information provided by the MAC layer. That transport format information indicates how many RLC PDUs should be received in each radio frame. During the next L1 time period, the retransmitted PDU 2 is received, and the EPC is incremented to two. At this count, the receiver checks to determine if all of the PDUs requested to be retransmitted have been properly received. Since both retransmitted PDUs 1 and 2 have been properly received, both the transmitter and receiver continue as before the retransmissions.

Figure 7:
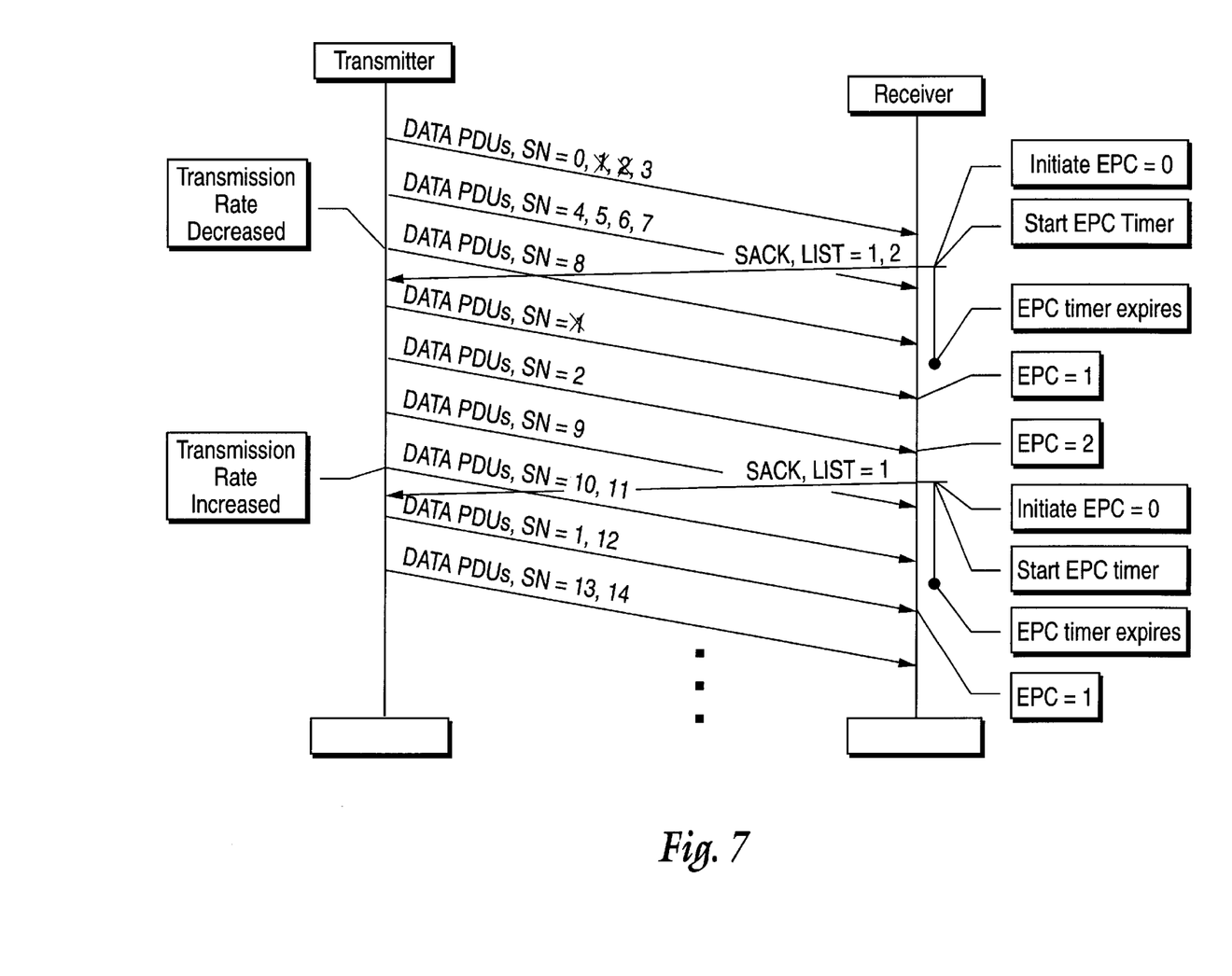
FIG. 7 is a diagram illustrating another specific example of the present invention.

However, there may be situations when one or more of the retransmitted PDUs is either lost or erroneously received. FIG. 7 illustrates an example of such a situation. FIG. 7 is similar to FIG. 6 except that the first retransmitted PDU 1 is not properly received by the receiver. Nevertheless, at the end of the L1 time period when PDU 1 should have been received, the EPC is incremented by one. At the end of the next L1 time period, PDU number 2 is properly received, and the EPC increments to two. The determination is made at that point that although PDU 1 should have been received by this time, it was improperly received. As a result, the receiver sends another selective acknowledgment back to the transmitter requesting retransmission of PDU 1.

At this second request for retransmission, the EPC counter is initialized to zero, and the EPC timer is again started. PDU 9 is received at the end of the next L1 time period. The transmission rate is increased to two PDUs per L1 time period so that PDUs 10 and 11 are both transmitted during the next L1 time period. The transmitter receives the second request to retransmit and then sends the requested PDU 1 along with the next regular PDU 12 during the next L1 time period. However, just before that time, the EPC timer expired enabling the EPC counter. When the next L1 time period occurs, corresponding to receipt of PDUs 1 and 12, the EPC is incremented to one. At that time, the detection and analysis block 96 determines that the requested PDU 1 should have been, and indeed was, properly received. Thereafter, both the transmitter and receiver continue as before the retransmission.

Figure 8:
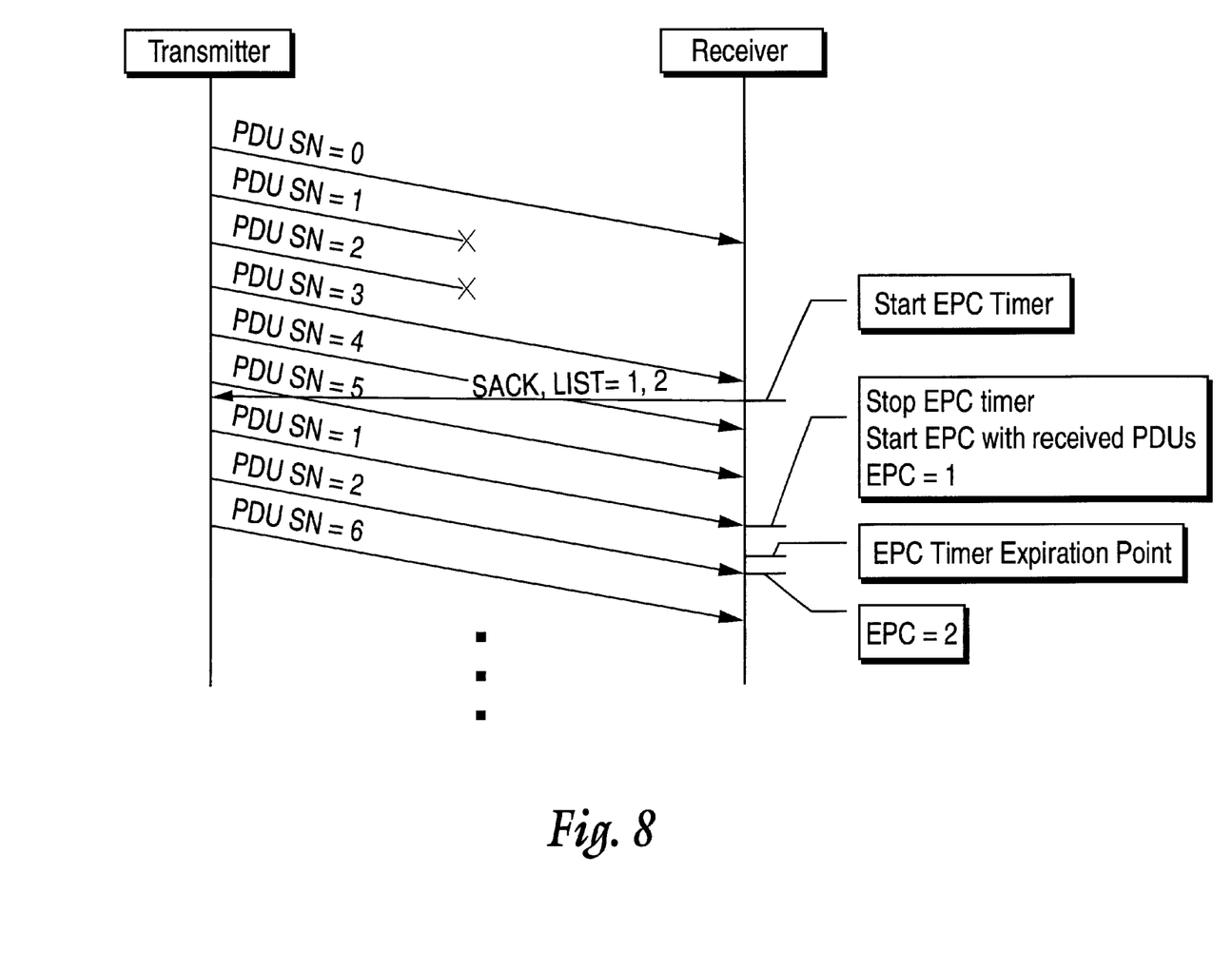
FIG. 8 is a diagram illustrating yet another specific example of the present invention.

There also may be situations when the EPC timer is set to a value that is too large or too small. For example, FIG. 8 illustrates an example of a situation where the EPC timer is set for too long of a time-out period. As shown, PDUs 1 and 2 are not properly received. The EPC timer is started shortly after receipt of PDU 3 when the receiver detects that PDUs 1 and 2 were not properly received. The receiver sends a SACK message to the transmitter listing PDUs 1 and 2. Because the EPC timer is set with too large of a time-out value, the retransmitted PDU 1 is received before the EPC timer expires. Consequently, the EPC is started anyway with the number of requested PDUs received—which in this instance is 1. The EPC then increments to 2 when retransmitted PDU 2 is received. The receiver determines at this point that all requested PDUs have been properly received.

In contrast to a simple time-out approach that results in large transmission delays and unnecessary retransmission requests/retransmissions, the present invention adapts to changing transmission conditions and provides an optimal time to determine if expected data units have arrived. By accounting for the round trip delay of a request to transmit certain data units, the counter starts counting expected data units at a point in time from which it is reasonable to expect that all of the requested units will have been transmitted and should have been received. Moreover, the counter adapts to varying conditions such as too long or too short an EPC timer value and changes in transmission rate on the communications channel. For the latter situation, the count value is changed by the number of data units that should be received during each time interval. More time is effectively provided when the transmission rate is lower, and less time is allowed at higher transmission rates. The present invention therefore efficiently and optimally balances delay and retransmit requests and retransmissions.

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to embodiments in the context of ARQ protocols, it is to be understood that these embodiments are non-limiting examples of the invention. The invention may be generally applied to any context where data units are requested to be transmitted and the requestor needs to determine when those data units should have been received. Accordingly, it is intended that the invention be limited only by the spirit and scope of the claims appended hereto.

What is claimed is:

1. A first communications node capable of communicating with a second communications node, comprising the steps of:

sending a request to the second node requesting transmission of one or more data units;

starting a counter after a time period associated with the transmission request; and determining, based on a value output by the counter, whether the requested one or more data units has been received.

2. The method in claim 1, wherein before the sending step the method further comprises:

receiving data units transmitted from the second communications node, and determining that one or more of the transmitted data units was not received or was improperly received, wherein the sending step includes requesting retransmission of one or more data units not received or improperly received, and wherein the counter is started after a time period associated with the retransmission request.

3. The method in claim 2, wherein if the requested one or more data units is not received or is improperly received, repeating the sending, starting, and determining steps.

4. The method in claim 1, further comprising:

providing a counter controller to establish the time period.

5. The method in claim 4, wherein the counter controller is a timer, the method further comprising:

starting the timer when the request is sent, and setting the counter with an initial value at or before the ending of the timer.

6. The method in claim 5, wherein when the timer reaches the time period, the counter counts to provide an estimate of a number of data units that should have been received from the second node.

7. The method in claim 5, wherein if a requested PDU is received before the time period expires, the counter then begins counting from the requested PDU.

8. The method in claim 4, wherein the counter controller is another counter counting time intervals in order to estimate the time period.

9. The method in claim 1, further comprising:

changing the count value after a time interval expires during which a number of data units may be transmitted.

10. The method in claim 9, wherein the count value is incremented after each time interval until the count value equals the number of data units that should have been received from the second node.

11. The method in claim 10, wherein if the one or more data units is not received or is improperly received when the count value equals the number of data units that should have been received from the second node, the method further comprises:

setting the time period again;

requesting that the one or more data units not received or improperly received be retransmitted;

resetting the counter; and starting the counter after the set time period expires.

12. The method in claim 9, wherein the time interval corresponds to a frame on a communications channel between the first and second communications nodes.

13. The method in claim 12, wherein the time interval corresponds to plural frames.

14. The method in claim 12, wherein the communications channel is a radio channel and the time interval is a radio frame on the order of 10 milliseconds.

15. The method in claim 9, wherein an integral number of data units is transmitted during the time interval.

16. The method in claim 9, wherein the count value is changed each time interval with a number of data units that should have been transmitted during that time interval.

17. In a radio communications system where protocol data units (PDUs) are communicated between a transmitter and a receiver over a radio communications channel, where data units are sent during specified channel time intervals, a method of monitoring a communication between the transmitter and the receiver, comprising the steps of:

(a) detecting that a PDU transmitted by the transmitter to the receiver was not properly received by the receiver;

(b) sending a message from the receiver to the transmitter requesting that the PDU be retransmitted;

(c) starting a time monitor in cooperation with sending the message;

(d) after the time monitor indicates that a predetermined time period has elapsed, starting a PDU counter;

(e) changing a value in the PDU counter after a next specified radio time interval expires; and (f) determining, based on a value output by the PDU counter, whether the requested PDU has been properly received.

18. The method in claim 17, wherein after the next specified radio time interval, the value in the PDU counter is changed based on a number of PDUs that should have been delivered to the receiver during that next specified radio time interval.

19. The method in claim 17, wherein if the PDU counter reaches a count value indicating that the requested PDU should have been properly received by the receiver, and if the requested PDU has not been properly received at the receiver, repeating steps (b)–(f).

20. The method in claim 17, wherein in response to a change in a transmission rate, different numbers of PDUs may be transmitted during one of the specified radio time intervals.

21. The method in claim 17, wherein the message is a selective acknowledgment message transmitted on a radio link control (RLC) communications protocol layer.

22. The method in claim 17, wherein if the requested PDU is received before the time period expires, the counter then begins counting from the requested PDU.

23. The method in claim 17, wherein the timer monitor is another counter counting time intervals in order to estimate the predetermined time period.

24. For use in a communications system, a communications unit comprising:

a receiver configured to receive data units over a communications channel from another communications unit;

a transmitter configured to transmit a request to the other communications unit to transmit a number of data units to the communications unit;

a counter for storing a count value indicating the number of data units to be transmitted; and a time monitor configured to cause the counter to begin counting after a time interval associated with the transmit request expires, wherein the communications unit is configured to use the count value to determine whether number of data units have been transmitted and then properly received.

25. The communications unit in claim 24, wherein data units are communicated over a communications channel in channel frames and the counter is incremented after a channel frame.

26. The communications unit in claim 24, wherein during a channel frame, an integer number of data units may be transmitted and wherein the integer number of data units per channel frame may differ for different channel frames.

27. The communications unit in claim 26, wherein the number of data units transmitted during a channel frame varies depending on a size of the data unit and a data unit transmission rate.

28. The communications unit in claim 24, wherein the communication unit is a mobile station having a radio link control (RLC) protocol layer that includes the time monitor and the counter.

29. The communications unit in claim 24, wherein the communication unit is a radio network controller in a radio access network having a radio link control (RLC) protocol layer that includes the timer and the counter.

30. The communications unit in claim 24, wherein the communications system is a radio communications system and the communications unit is a mobile station.

31. The communications unit in claim 24, wherein the communications system is a radio communications system and the communications unit is a radio network node.

32. The method in claim 24, wherein if a requested PDU is received before the time period expires, the PDU counter then begins counting from the requested PDU.

33. The method in claim 24, wherein the timer monitor is another counter counting time intervals in order to estimate the time interval.

34. A method for operating a first communications unit, comprising the steps of:

receiving at the first communications unit data units transmitted by a second communications unit over a communications channel;

requesting the second communications unit to transmit one or more data units to the first communications unit; and determining at the first communications unit when the requested one or more data units should be received including compensating for a delay corresponding to the transmit request and for a current transmission rate over the communications channel.

35. The method in claim 34, wherein the delay is compensated for using a timer and the current transmission rate is compensated for using a counter.

36. The method in claim 35, wherein when the timer indicates that a predetermined time period corresponding to the delay has expired, the counter begins counting to determine when the requested one or more data units should be received by the first communications unit.

37. The method in claim 36, wherein if the requested one or more data units are not received when the counter reaches a particular count value, the method further comprises:

sending a retransmit request to the second communications unit.

38. The method in claim 37, wherein the particular count value corresponds to a number of data units that should have been received by the first communications unit.

39. The method in claim 34, wherein the second communications unit is requested to retransmit one or more data units to the first communications unit.

* * * * *